(12) United States Patent
Cristian et al.

(10) Patent No.: US 8,254,293 B2
(45) Date of Patent: Aug. 28, 2012

(54) METHODS AND SYSTEMS FOR LOCATION ESTIMATION

(75) Inventors: Voicu Cristian, Marietta, GA (US); Marius Chilom, Mableton, GA (US); Robert Assimiti, Atlanta, GA (US); Ovidiu Ratiu, Marietta, GA (US); Ion Ticus, Bucharest (RO); Ioan Pocol, Cluj-Napoca (RO)

(73) Assignee: Nivis, LLC, Atlanta, GA (US)

( * ) Notice: Subject to any disclaimer, the term of this patent is extended or adjusted under 35 U.S.C. 154(b) by 387 days.

(21) Appl. No.: 12/473,600

(22) Filed: May 28, 2009

(65) Prior Publication Data

US 2010/0014443 A1    Jan. 21, 2010

Related U.S. Application Data

(60) Provisional application No. 61/130,036, filed on May 28, 2008.

(51) Int. Cl.
*H04L 12/28*    (2006.01)
(52) U.S. Cl. .................................................. 370/255
(58) Field of Classification Search ............... 370/255, 370/328; 455/456.1, 456.2, 456.3, 456.6
See application file for complete search history.

(56) References Cited

U.S. PATENT DOCUMENTS

| | | | |
|---|---|---|---|
| 5,602,903 A | 2/1997 | LeBlanc et al. | |
| 5,883,598 A | 3/1999 | Parl et al. | |
| 6,311,283 B1 | 10/2001 | Gonzalez | |
| 6,327,474 B1 | 12/2001 | Ruutu et al. | |
| 6,473,038 B2 | 10/2002 | Patwari et al. | |
| 7,209,712 B2 | 4/2007 | Holtzman | |
| 7,983,691 B1* | 7/2011 | Wong et al. | 455/456.1 |
| 2004/0005902 A1 | 1/2004 | Belcea | |
| 2005/0149296 A1* | 7/2005 | Sieracki | 702/189 |
| 2006/0007882 A1 | 1/2006 | Zeng et al. | |
| 2008/0112699 A1 | 5/2008 | Huseth et al. | |
| 2009/0059795 A1 | 3/2009 | Fonseca, Jr. et al. | |
| 2009/0109866 A1 | 4/2009 | Kim et al. | |

FOREIGN PATENT DOCUMENTS

| | | |
|---|---|---|
| EP | 1463230 A | 9/2004 |
| EP | 1587233 A | 10/2005 |
| EP | 1933507 A1 | 6/2008 |
| WO | 99/31811 A1 | 6/1999 |
| WO | 03/107595 A1 | 12/2003 |

(Continued)

OTHER PUBLICATIONS

International Search Report and Written Opinion, PCT/US2009/045433, mailed Apr. 19, 2010.

(Continued)

*Primary Examiner* — Dang Ton
*Assistant Examiner* — Nourali Mansoury
(74) *Attorney, Agent, or Firm* — Kilpatrick Townsend & Stockton LLP

(57) ABSTRACT

A network operating center for a network comprising known-location and unknown-location nodes can be configured to receive from each unknown-location node estimates of the distances from that node to each of its neighbor nodes. The network controller can then choose an initial location estimate for each unknown-location node and compute distances from the initial location estimates to the corresponding neighbor nodes. The network operating center can then choose subsequent location estimates of the unknown-location nodes by minimizing an error criterion based on a comparison of the received neighbor node distance estimates with the computed neighbor node distances.

25 Claims, 14 Drawing Sheets

FOREIGN PATENT DOCUMENTS

| | | |
|---|---|---|
| WO | 2005/065162 A2 | 7/2005 |
| WO | 2005/065202 A2 | 7/2005 |
| WO | 2008/124041 A2 | 10/2008 |

OTHER PUBLICATIONS

International Search Report and Written Opinion, PCT/US2009/052345, mailed Nov. 2, 2009.

Non-final Office Action, U.S. Appl. No. 12/533,363, mailed Feb. 4, 2011.

International Search Report and Written Opinion, PCT/US2009/052348, mailed Dec. 18, 2009.

* cited by examiner

METHODS AND SYSTEMS FOR LOCATION ESTIMATION

RELATED APPLICATIONS

This application claims the benefit of U.S. Provisional Application No. 61/130,036 filed on May 28, 2008, which is incorporated herein by reference.

FIELD OF DISCLOSURE

The field of this disclosure relates to positioning systems and more particularly to methods and systems for estimating the location of a network node based on estimates of the distance between the node and other network nodes of both known and unknown locations.

BACKGROUND

Networks may include nodes whose locations are known as well as nodes whose locations are unknown. For example, in a wireless communication network, mobile units may comprise nodes in the network. Because these nodes are mobile, they do not remain at a fixed location. Typically, a network operating center maintains information about the locations of the known-location nodes in a database and attempts to maintain up-to-date estimates of the locations of the unknown-location nodes as well. The approach utilized by the network operating center to keep track of the unknown-location nodes can be a function of the nature of the network. For example, certain types of nodes may be able to estimate the distance from itself to a neighbor node. Such information can then be used to help estimate where the node is located at any given time.

The present subject matter relates to novel approaches to estimating the locations of unknown-location nodes in a network based on estimates of distances from the unknown-location nodes to their neighbor nodes.

SUMMARY

Embodiments comprise methods and systems of position location estimation in a network comprising known-location and unknown-location nodes.

In some embodiments, estimates of the distances from an unknown-location node to its neighbor nodes are communicated to a network control center, which uses these distance estimates to estimate the physical location of the unknown-location node.

In some embodiments, methods of estimating the physical location of one or more unknown-location nodes in a network comprising known-location nodes and unknown-location nodes comprise maintaining in a database known locations of the known-location nodes and estimates of locations of the unknown-location nodes; receiving neighbor node distance estimates for each of the one or more unknown-location nodes; choosing an initial location estimate for each of the one or more unknown-location nodes; computing neighbor node distances for each of the one or more unknown-location nodes; and choosing a subsequent location estimate for each of the one or more unknown-location nodes based on a comparison of the neighbor node distance estimates with the computed neighbor node distances.

These illustrative embodiments are mentioned not to limit or define the limits of the present subject matter, but to provide examples to aid understanding hereof. Illustrative embodiments are discussed in the Detailed Description, and further description is provided there. Advantages offered by the various embodiments may be further understood by examining this specification and/or by practicing one or more embodiments of the claimed subject matter.

BRIEF DESCRIPTION OF DRAWINGS

These and other features, aspects, and advantages of the present disclosure are better understood when the following Detailed Description is read with reference to the accompanying drawings, wherein.

DETAILED DESCRIPTION

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

Figure 1:
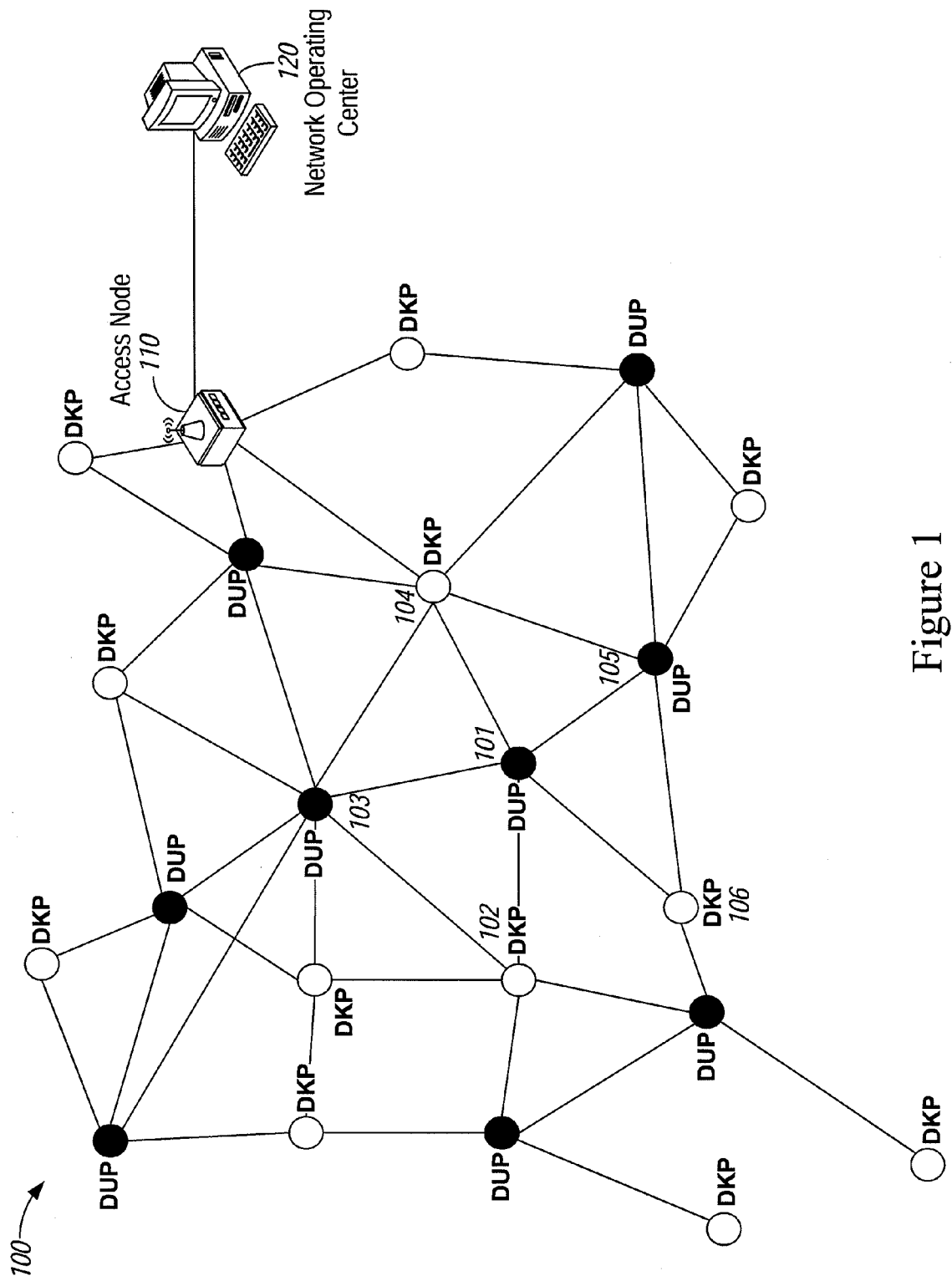
FIG. 1 illustrates an exemplary system in certain embodiments.

An exemplary embodiment estimates the location of a network node whose location is unknown through use of estimates of the distance from the node to that node's neighbor nodes. FIG. 1 illustrates an exemplary network comprising nodes whose positions are known as well as nodes whose positions are unknown. In particular, the node labeled 101 is exemplary of a node whose position is unknown ("DUP"). In this exemplary network, DUP 101 has neighbor nodes 101, 102, 103, 104, and 105, which comprise both DUPs and nodes whose positions are known ("DKPs"). Thus, in FIG. 1, each DUP node 101, 103, 105 may be termed an "unknown-location node" whereas each DKP node 102, 104, 106 may be termed a "known-location node." In addition, this exemplary network includes an access node 110, which comprises a network controller that serves as a gateway between the network nodes and to a network operating center 120.

Figure 2:
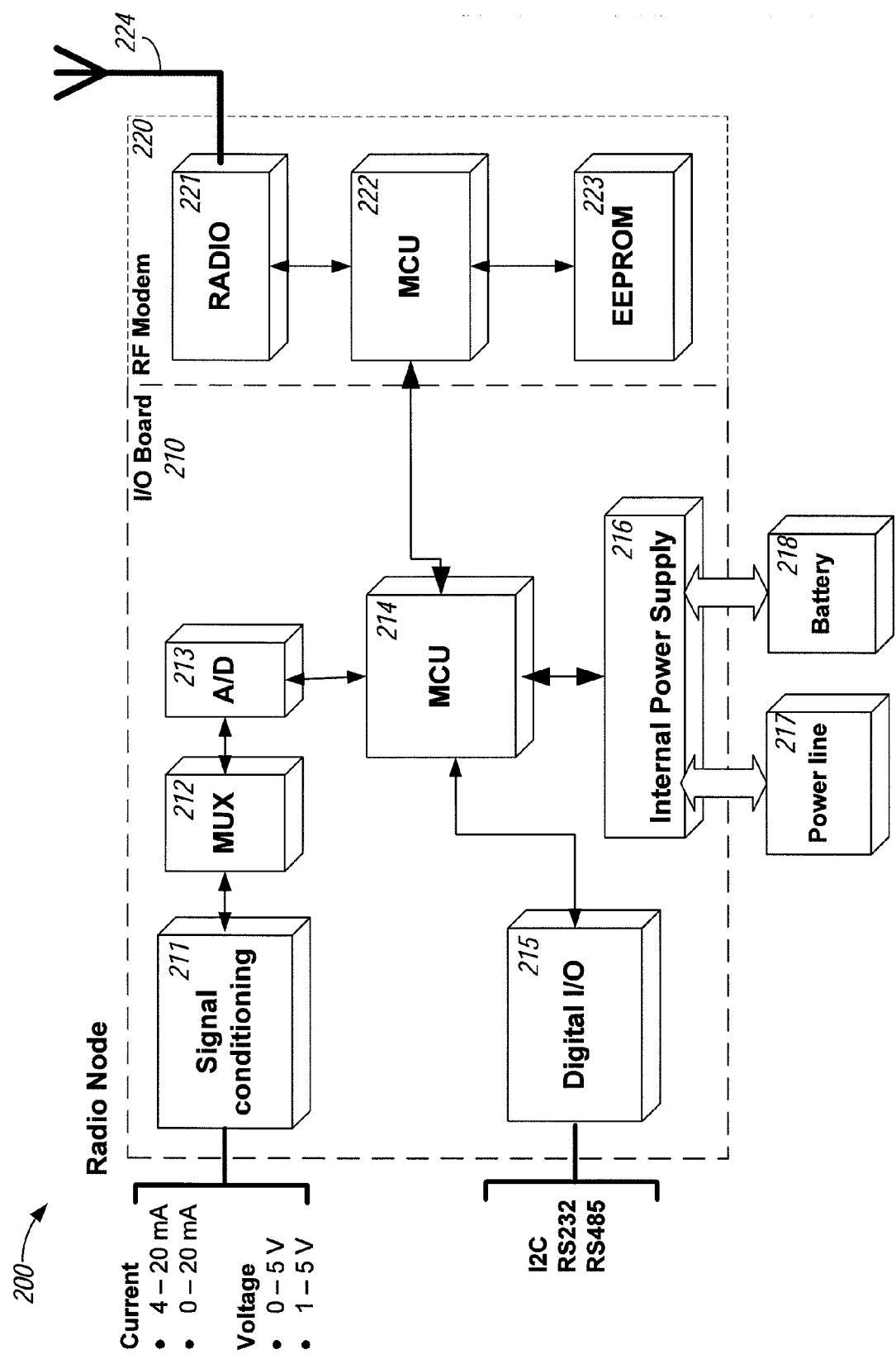
FIG. 2 illustrates an exemplary network node in certain embodiments.

In one exemplary embodiment the DKP and DUP network nodes comprise radio nodes. In certain embodiments a radio node comprises a radio frequency ("RF") modem and one or more application-dependent boards, which perform application specific functions, for example data acquisition, information display, power up, etc. FIG. 2 provides an illustration of one embodiment of a radio node 200, comprising an input/output ("I/O") board 210 and a radio modem 220. In this illustrative embodiment the I/O board further comprises a signal conditioning unit 211, which couples to a multiplexer ("MUX") 212, which couples to an analog-to-digital ("A/D") converter 213, which in turn couples to a processor unit ("MCU") 214. Further, the I/O board 210 also comprises a digital I/O unit 215 which couples to the MCU 214 and an internal power supply 216, which couples to a power line 217 and battery 218 as well as the MCU 214. The radio modem 220 of exemplary radio node 200 comprises a radio 221 coupled to its own processor unit ("MCU") 222 and memory ("EEPROM") 223. The radio 221 also comprises an antenna 224.

The radio modem 220 enables the radio node 200 to communicate data bi-directionally with other radio nodes. In particular, a DUP node 101 may estimate the distance between it and its neighbor nodes 102, 103, 104, 105, 106 and report these distance estimates to other network nodes, such as access node 110, which in turn may communicate these distance estimates to the network operating center 120. Methods for estimating the distance between nodes are well-known in the art and include, without limitation, methods utilizing received signal strength indication ("RSSI"), time of arrival ("TOA"), phase estimation, as well as other known methods or any combination of these methods. DUP node 101 can employ any of these well-known methods to estimate the distances between itself and its neighbor nodes 102, 103, 104, 105, 106 and can communicate these neighbor node distance estimates to network operating center 120 through the network itself, either in specially designed messages or embedded in regular data messages.

Figure 3:
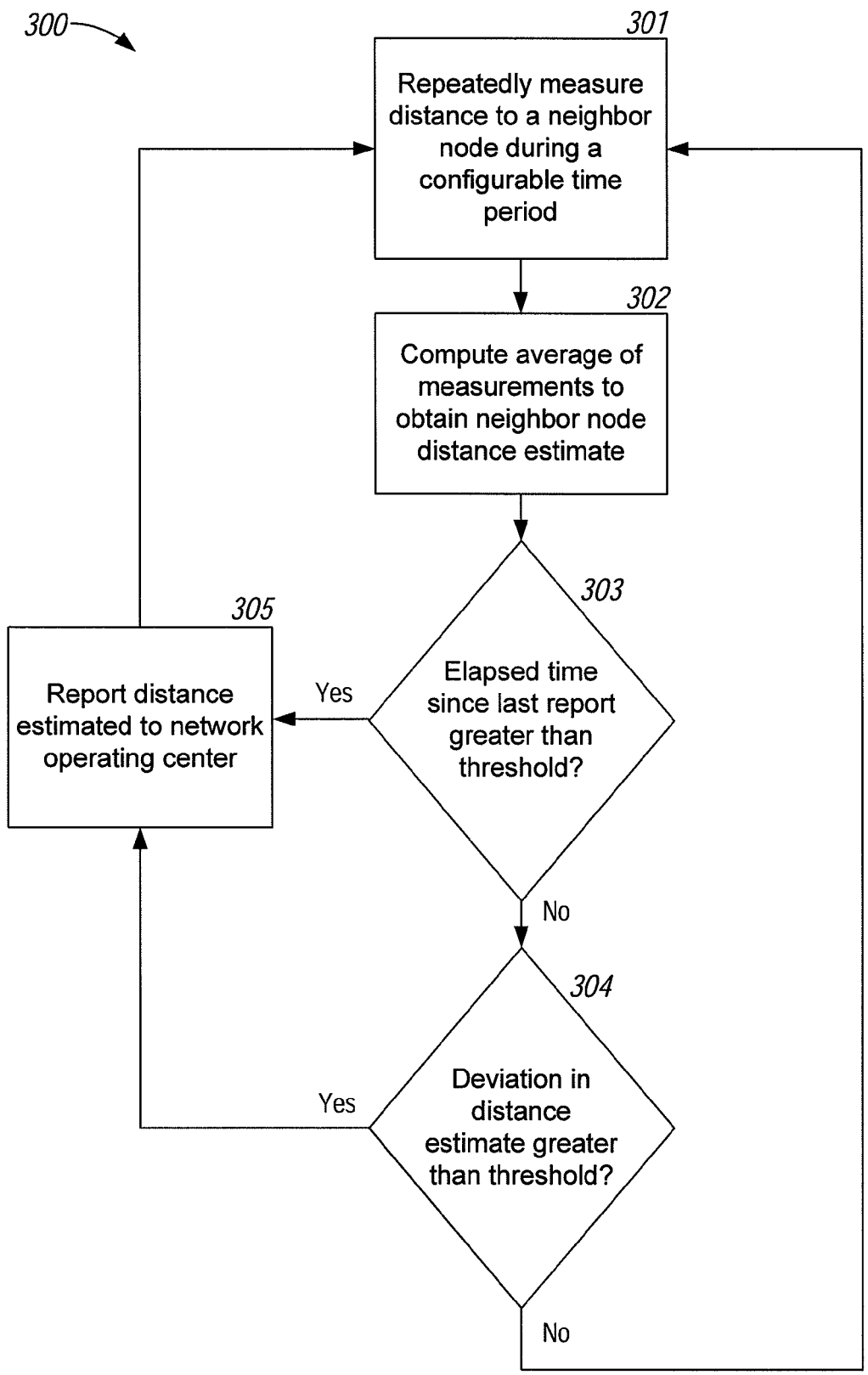
FIG. 3 is a flowchart illustrating a method according to certain embodiments.

Flowchart 300 of FIG. 3 illustrates an approach to obtaining neighbor node distance estimates at DUP node 101 in an exemplary embodiment. The following discussion applies to each neighbor node of a given node, for example neighbor nodes 102, 103, 104, 105, 106 of DUP node 101. At block 301 DUP 101 measures the distance between it and a neighbor node using any known measurement technique utilizing a signal or signals transmitted between the unknown-location node and the neighbor node. Techniques to measure a distance to a neighbor node are well-known and include, without limitation, measurement of a signal strength sent to or received from the neighbor node, measurement of the phase of signal received at the unknown-location node or the neighbor node, and measurement of the time of arrival of a signal sent to or received from a neighbor node. One of ordinary skill in the art would recognize that other distance estimation techniques are available and could be utilized herein. Exemplary techniques for estimating the locations of nodes in a network or the distance to one or more nodes from a given location may be found in U.S. Pat. Nos. 5,602,903, 5,883,598, 6,327,474, and 6,473,038, each of which is incorporated herein in its entirety for all purposes.

Such measurements are repeated over a configurable period of time, e.g., an hour, and at block 302 the measurements collected over that period of time are averaged to obtain a neighbor node distance estimate. Such averaging helps to eliminate false readings and smooth out measurement errors. At decision block 303, DUP node 101 checks whether the elapsed time since the last report of a neighbor node distance estimate exceeds some configurable threshold, e.g. 24 hours, and if so the process branches to block 305 where the neighbor node distance estimate is reported to network operating center 120. If the elapsed time does not exceed the threshold, then the process branches to decision block 304, where the neighbor node distance estimate is then compared to the neighbor node estimate previously reported to network operating center 120. If the neighbor node distance estimate deviates from the previously reported neighbor node distance estimate by a configurable percentage or more, the process branches to block 305 where the neighbor node distance estimate is reported to network operating center 120. If the neighbor node distance estimate does not differ from the previously reported estimate by a sufficiently large amount, then the node does not report the neighbor node distance estimate to network operating center 120 and the process branches back to block 301 to resume. Such an approach saves system resources by eliminating unnecessary communications to network operating center 120. After a neighbor node distance estimate is reported to network operating center 120 at block 305, the process branches back to block 301 to resume.

Figure 4:
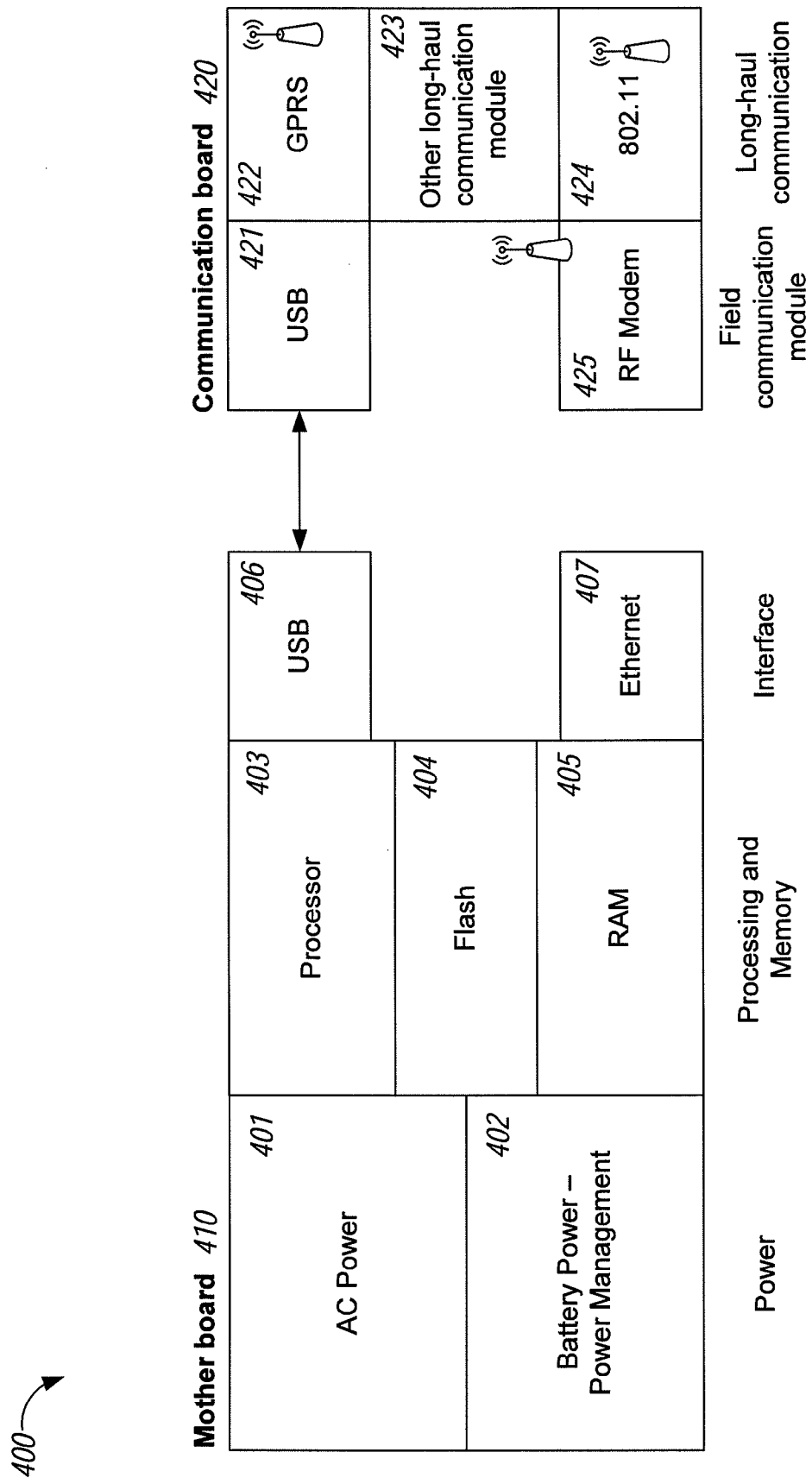
FIG. 4 illustrates an exemplary access node in certain embodiments.

In certain embodiments, network 100 comprises an access node 110 that comprises a network controller and serves as a gateway between nodes (e.g. DUPs 101, 103, 105 and DKPs 102, 104, 106) and to network operating center 120. In an exemplary embodiment access node 110 has a known location and comprises an RF modem for communicating with radio nodes and one or more communication methods for communicating with network operating center 120. FIG. 4 illustrates a access node 400 in an exemplary embodiment comprising a mother board 410 and a communications board 420. Motherboard 410 further comprises power components 401 and 402 directed at AC power and DC power respectively. It further comprises processing and memory components in the form of a processor 403, flash memory 404, and random access memory ("RAM") 405. Additionally there is a USB interface 406 and an Ethernet interface 407. Communication board 420 comprises USB interface 421, GPRS modem 422, a long-haul communication module 423, an 802.11 interface 424, and an RF modem 425.

In an exemplary embodiment, network 100 may take the form of an RF mesh network in which the radio nodes communicate to the access node either directly or through other radio nodes. The communication paths are built automatically and if they are broken new paths are established automatically. Such a network is self-configuring and self-healing. The radio nodes utilize an RF mesh protocol to form and operate the RF mesh network.

Figure 5:
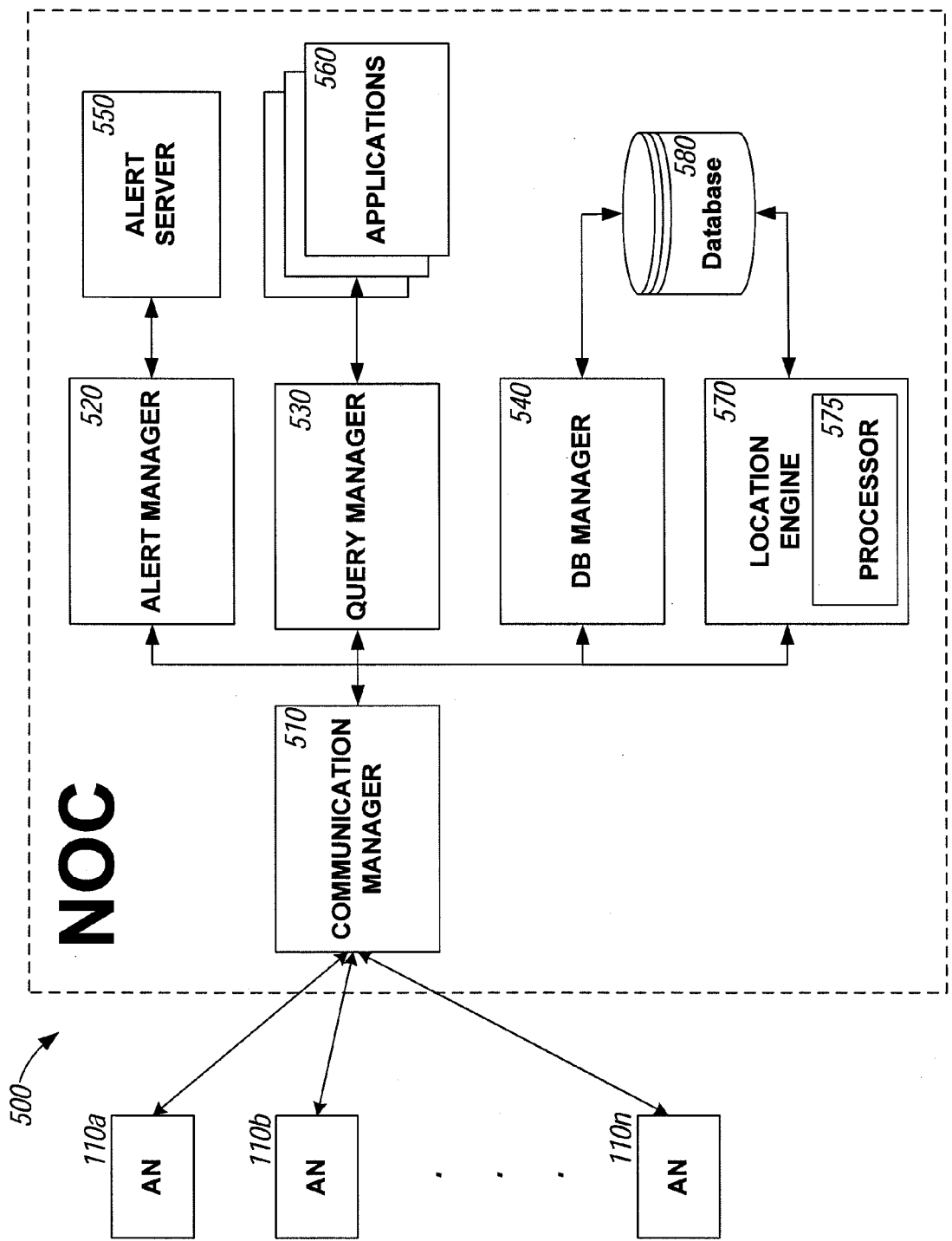
FIG. 5 illustrates an exemplary network operating center in certain embodiments.

Access node 110 communicates neighbor node distance estimates for a node to network operating center 120. In certain embodiments, network operating center 120 ("NOC") comprises a collection of applications that allow network management, data acquisition, storing, presenting, and exporting the data, handling events and/or alarms, determining the location of nodes in the network using a location engine, etc. FIG. 5 illustrates a network operating center 500 in an exemplary embodiment. Network operating center 500 comprises various managers, such as a communication manager 510, an alert manager 520, a query manager 530, and a database manager 540. Alert manager 520 mediates between alert server 550 and communication manager 510. Query manager 530 mediates between various applications 560 that allow, for example, network management, data acquisition, storage, presentation, and exporting of data, handling of events, alarms. Another application is determining the position of network nodes using location engine 570, which interacts with database 580, which in turn interacts with database manager 540. Communication manager 510 mediates between the various elements of network operating center 500 and access nodes 110a, 110b, ..., 110n. Location engine 570 comprises a processor 575.

As discussed above, in a real deployment some devices will be placed in a known position (DKP) and some devices will be mobile or will be placed in an unknown position (DUP). A DUP will communicate with other DKPs or DUPs and will report to the NOC its estimated distance to each neighbor. The NOC maintains a network management database that stores the current status (i.e. DUP or DKP) of each device. Using those distances the NOC will estimate the position of each DUP.

Figure 6:
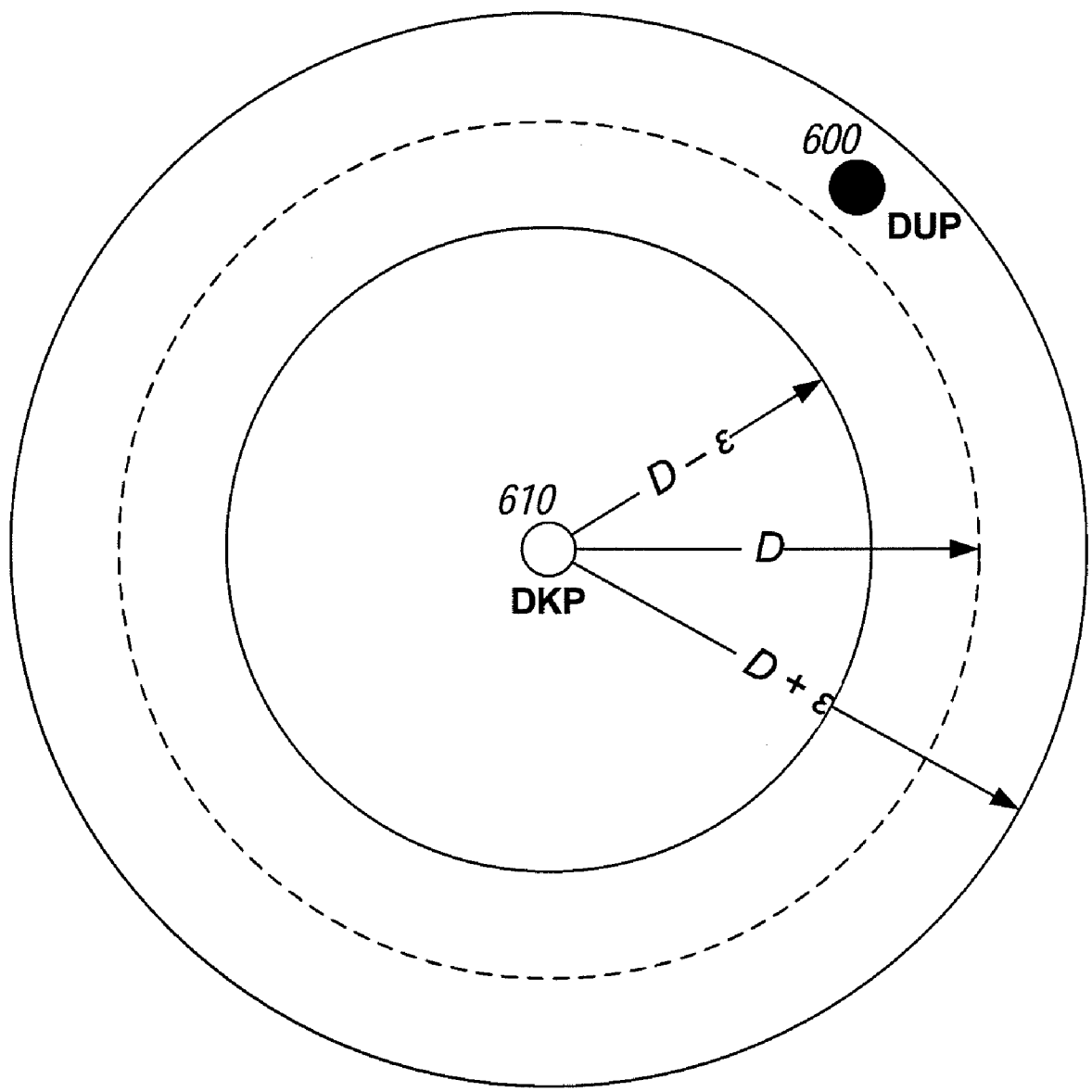
FIG. 6 illustrates a concept related to position estimation based on distance estimation.

If the exact distances from a DUP to several DKPs were known precisely, various techniques, for example triangulation, could be used to obtain precise determination of the location of the DUP. However, in many cases the exact position between a DUP and a DKP cannot be estimated due to measurement or estimation errors. In such a case, the exact location of the DUP may not be determinable. For instance, as illustrated in FIG. 6, if a DUP 600 communicates with a single DKP 610 and the estimated distance between DUP 600 and DKP 610 is d, the position of DUP 600 could be anywhere on a circle with radius d and its center at DKP 610. The availability of exact distances to three different DKPs, for example, would give rise to three different such circles, whose intersection would precisely determine the location of the DUP. However, if the distance estimation is affected by an error $\epsilon$, the position of DUP 600 relative to a single DKP 610 could be anywhere on the area delimited by two circles with the radii D-$\epsilon$ and D+$\epsilon$ and their centers at DKP 610. The intersections of three such annular regions will not necessarily lead to a precise location for DUP 600.

Figure 7:
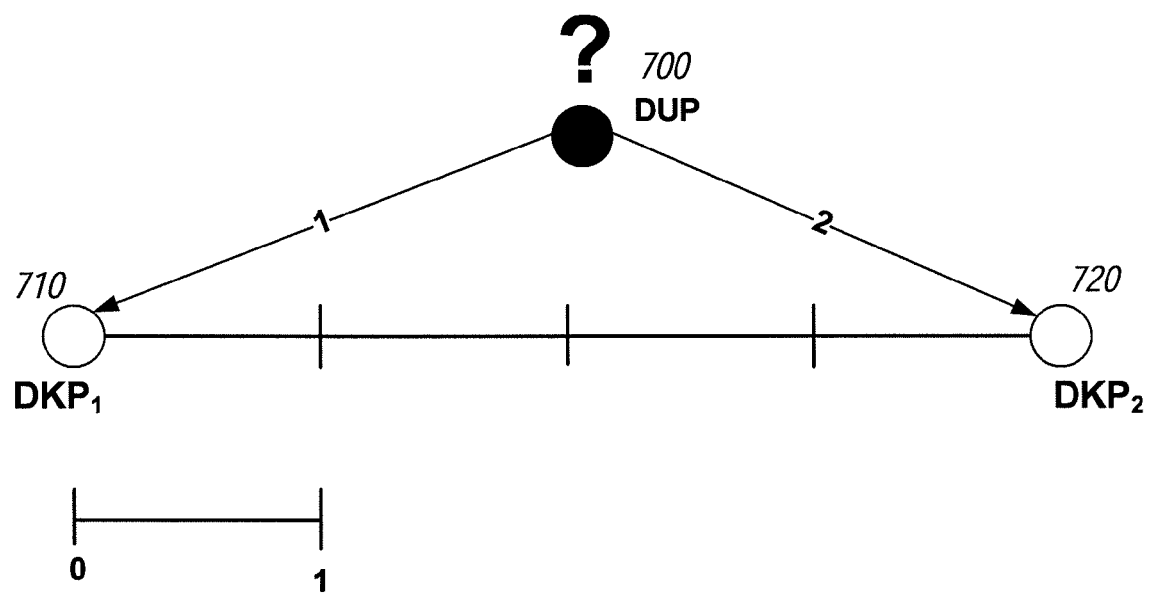
FIG. 7 illustrates a concept related to position estimation based on distance estimation.

To further illustrate the problem associated with distance estimates that may have errors, consider FIG. 7. If the distance estimate $D_1$ from DUP 700 to DKP 710 is 1 unit and the distance estimate $D_2$ from DUP 700 and DKP 720 is 2 units, then there is no physical location at which DUP 700 can be placed that satisfies both distance estimates. In this case, the NOC can guess as to the node's location and then compute the distances from that estimated location to the node's neighbors. It can then compare the computed neighbor node distances with the neighbor node distance estimates it received from the node to refine its guess as to the node's location.

Figure 8:
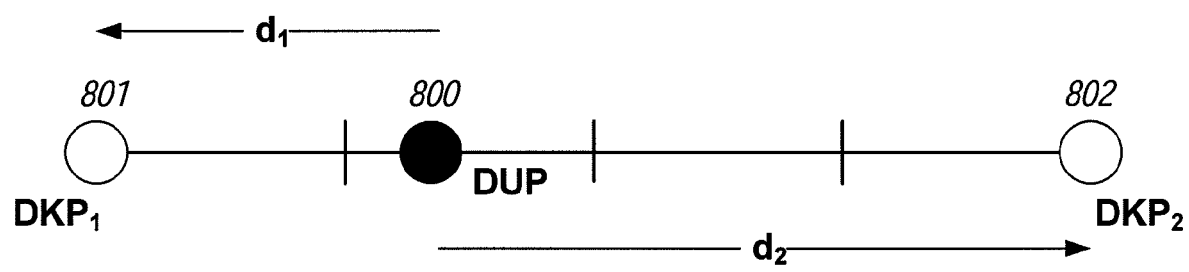
FIG. 8 illustrates an exemplary concept related to position estimation based on distance estimation in certain embodiments.
Figure 9:
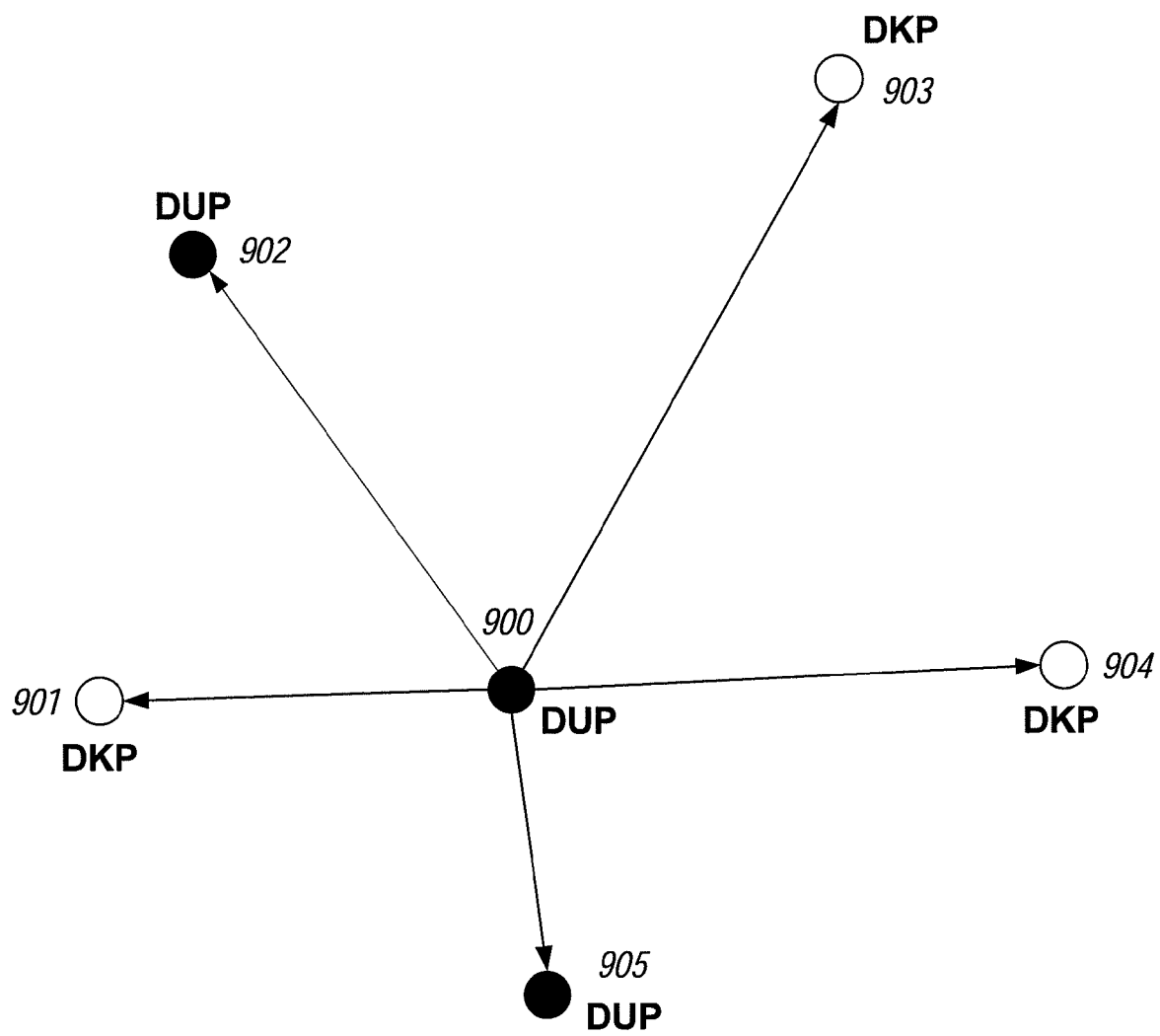
FIG. 9 illustrates an exemplary concept related to position estimation based on distance estimation in certain embodiments.

For example, following such a procedure in one embodiment the NOC could estimate the location of DUP 700 as shown in FIG. 8 by choosing a location that minimizes the total error E where total error is determined by the following formula:

$$E = \sum_{i=1}^{2} e_i, \tag{1}$$

where $$e_i = \frac{|d_i - D_i|}{D_i} \tag{2}$$

and $d_1$ and $d_2$ are the computed distances between the location that the NOC chooses for DUP 800 and the neighbor nodes whose distances were estimated, in this example DKPs 801, 802 respectively. Where the estimated distance are between a DUP and n neighbor nodes, which may comprise both DKPs and DUPs, as illustrated for example in FIG. 9, then equation (1) can be extended to $$E = \sum_{i=1}^{n} e_i \tag{3}$$

with equation (2) being applicable for i=1, ..., n.

Figure 10:
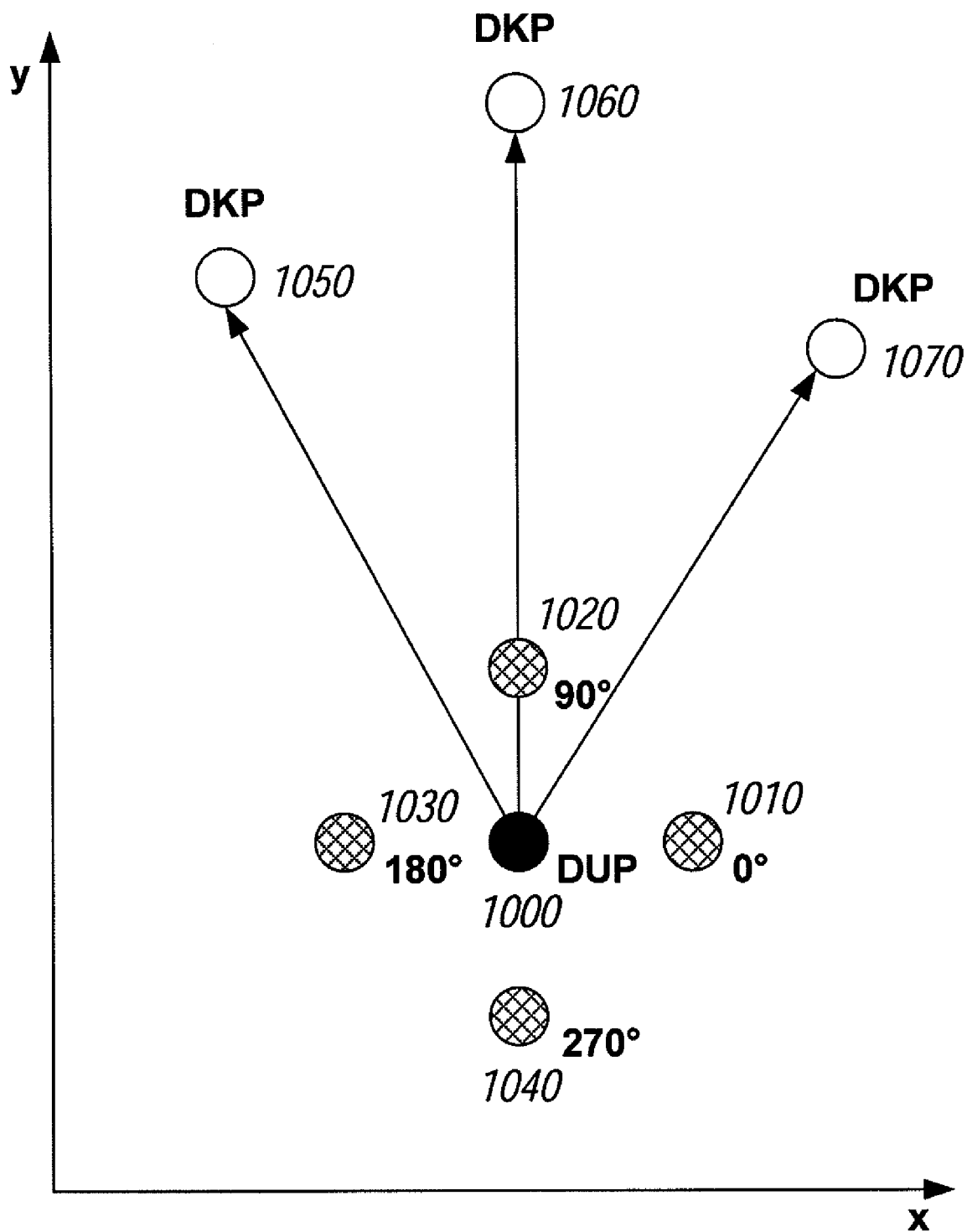
FIG. 10 illustrates an exemplary concept related to position estimation based on distance estimation in certain embodiments.

In one exemplary embodiment, the scope of an algorithm for determining a physical location for a DUP is to determine another position for the DUP so that the total error E for the new position is smaller than the E for the old position. For example, in FIG. 10 starting from the current estimated position of DUP 1000 and using an error minimization algorithm, total error E can be computed for 4 more possible positions 1010, 1020, 1030, 1040 situated at 0°, 90°, 180° and 270° respectively from the current position of DUP 1000. The distance between the current position and a future position can be chosen, for example, to be a step size $\delta$. In this case it is obvious that the estimated position 1020 situated at 90° from the current position of DUP 1000 has a lower value for E.

Referring again to FIG. 5, database 580 at network operating center 500 comprises locations of the known-location nodes and location estimates of the unknown-location nodes. Once a DUP reports the estimated neighbor node distances between it and each of its neighbor nodes to network operating center 500, location engine 510 can utilize these neighbor node distance estimates to update the estimated physical location of the DUP in database 580.

Figure 11:
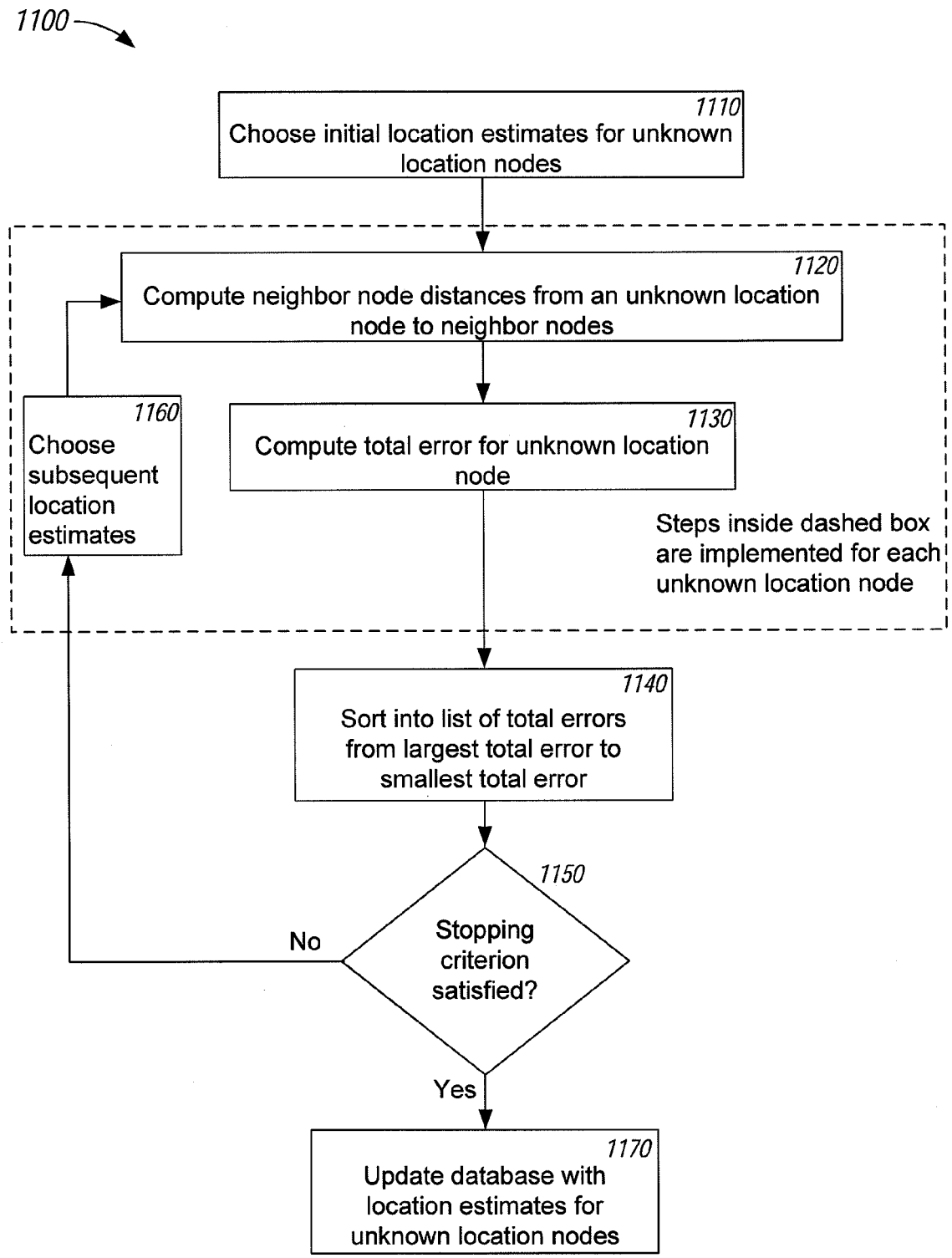
FIG. 11 is a flowchart illustrating a method according to certain embodiments.

FIG. 11 presents a flowchart 1100 in an exemplary embodiment for updating the estimated locations of the unknown-location radio nodes based upon the received neighbor node distance estimates for each unknown-location radio node. Starting at block 1110, the location engine 570 chooses initial location estimates for the unknown location nodes. For each unknown location node, location engine 570 then computes neighbor node distances from the estimated location to each of the neighbor nodes, whose locations are stored in database 580. Using these computed neighbor node distances along with the received neighbor node distance estimates, in block 1130 location engine 570 computes the total error according to equations (2) and (3) for each unknown location node. At block 1140 after the total error has been computed for each unknown location node, the unknown neighbor nodes are sorted into an ordered list such that the unknown location node with the largest total error is first, the unknown location node with the second largest total error is second, and so on.

The process of blocks 1120 through 1130 is implemented for each unknown location node in the network. Each iteration of blocks 1120 through 1130 for all unknown location nodes in the network is called an "epoch." After each epoch when the process has branched to block 1150, a stopping criterion is assessed. The stopping criterion may take the form of 1. The largest total error for all unknown location nodes is smaller than a threshold;
2. The total number of epochs exceeds a threshold; or
3. The sum of the total errors for all unknown location errors, termed the "total system error," is less than a threshold.

If the stopping criterion is not satisfied at block 1150, the process branches back to block 1160 where subsequent location estimates for the unknown location nodes are chosen, after which the process resumes at block 1120. If on the other hand the stopping criterion is satisfied at decision block 1150, then at block 1170 the database is updated with the location estimates for the unknown location nodes and the process stops.

The subsequent location estimate is chosen in one embodiment by taking a step of length δ in a configurable direction away from the previous location estimate.

In another exemplary embodiment, the direction in which the step is taken to obtain a subsequent location estimate may be based on the concept of tension reduction. In this concept, the link between a DUP and one of its neighbors could be interpreted as a string. The bigger the difference is between the reported distance D and the estimated distance d, the more tensioned the links will be. The equation that defines the tension is:

$$t = d - D \quad (5)$$

Figure 12:
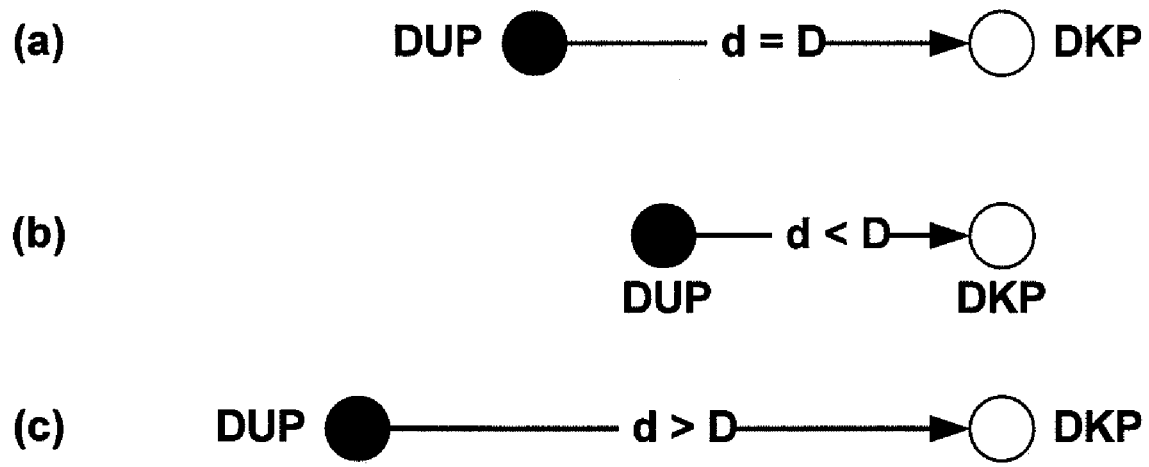
FIG. 12 illustrates a concept related to position estimation based on distance estimation.
Figure 13:
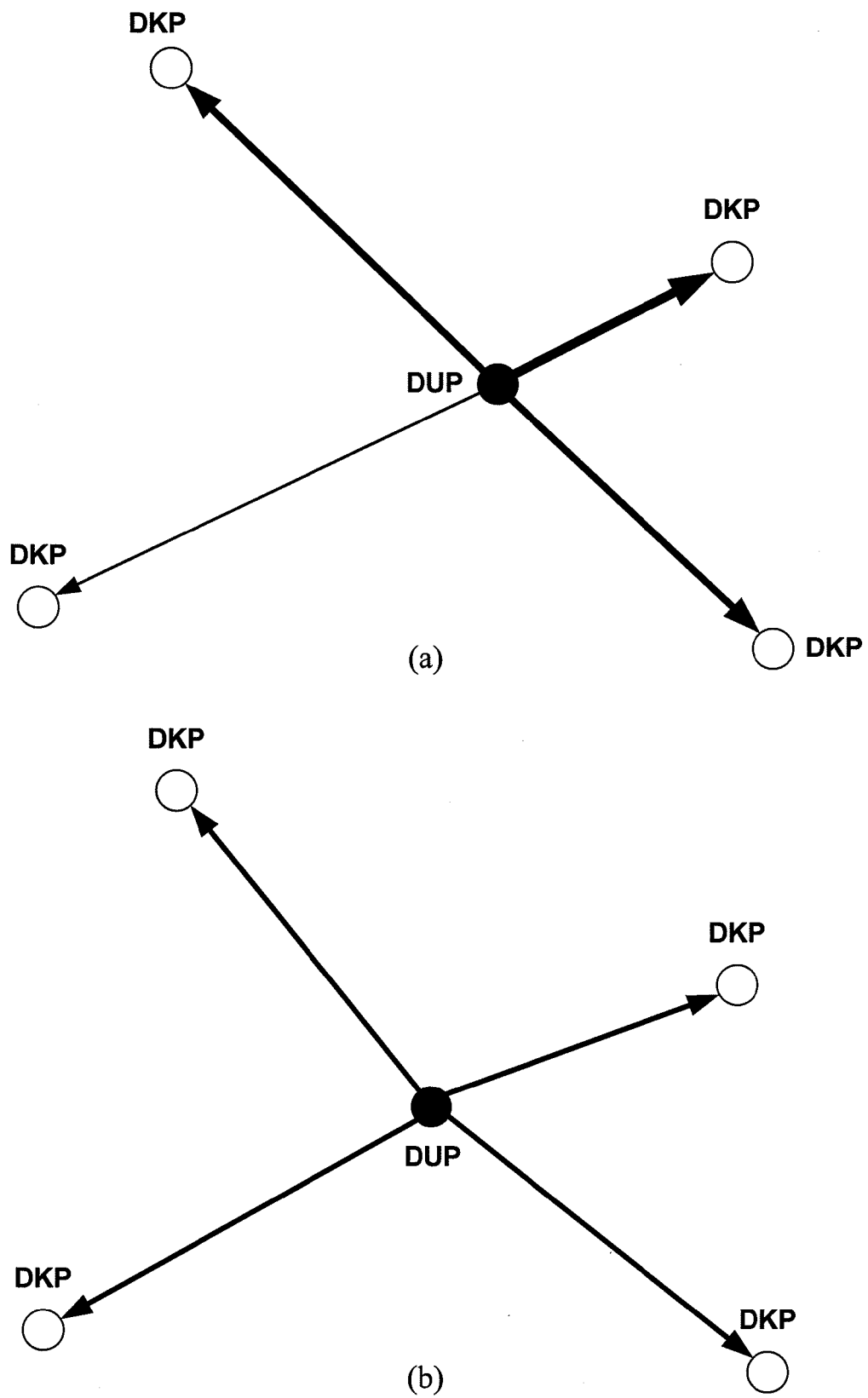
FIG. 13 illustrates an exemplary concept related to position estimation based on distance estimation in certain embodiments.
Figure 14:
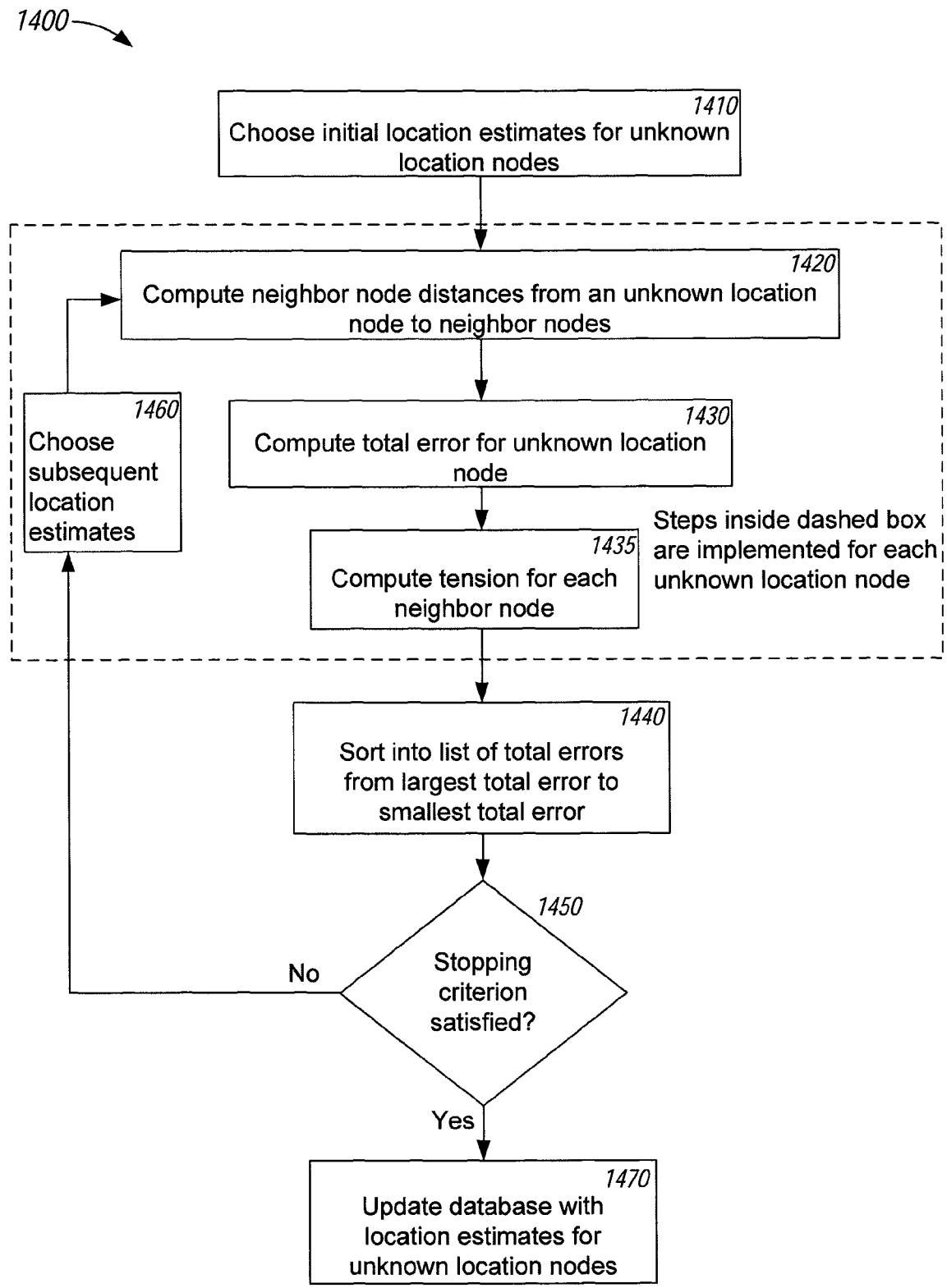
FIG. 14 is a flowchart illustrating a method according to certain embodiments.

FIG. 12 illustrates links under various amounts of tension. In FIG. 12(a), the reported distance D and the estimated distance d are equal, so the link has no tension. In FIGS. 12(b) and (c), the reported distance differs from the estimated distance, so the links have tension. In this approach, the location estimate is chosen so as to reduce tension in the links. If the tension t is negative (as in FIG. 12(b)), the subsequent location estimate of an unknown location node will be farther away from the neighbor node. Conversely, if t is positive (as in FIG. 12(c)) the subsequent location estimate will be closer to the neighbor node. Hence, in FIG. 13(a) an example illustrates DUP 1300 with tensioned links to its neighbors 1301, 1302, 1303, 1304, whereas FIG. 13(b) illustrates the same example after the location of DUP 1300 has been moved to reduce the tension in the links.

Flowchart 1400 describes the tension reduction approach in general and is essentially the same as flowchart 1100 described above in connection with FIG. 11 except that block 1435 has been added between blocks 1430 and 1440. Accordingly, the description of the blocks common to both flowcharts is not repeated. Rather, only the additional step at block 1435 is described. At block 1435, the tension is computed for each neighbor node of the unknown location node under consideration.

In an exemplary embodiment, the subsequent location estimate for each unknown location node is chosen as follows:
1. Identify the neighbor node link with the highest magnitude tension;
2. Choose the subsequent location estimate by stepping from the previous location estimate along the identified link;
3. If the tension is positive, the direction of the step is toward the neighbor node, whereas if the tension is negative, the step is away from the neighbor node.

The initial location estimates for each unknown location node may be chosen in several different ways. One approach is simply to choose them randomly. In yet another approach, the initial location estimate for an unknown location node is chosen as a point between the two known location neighbor nodes having the two shortest neighbor node distance estimates. If the unknown location node does not have two known location neighbors, then the initial location estimate is chosen as a point between the two unknown location neighbor nodes having the two shortest neighbor node distance estimates.

In an exemplary embodiment, the step length δ for a subsequent location estimate can be variable. The idea is to increase the value of δ if for two consecutive epochs the location estimate is changed in the same direction. If the location estimate is then changed in a different direction, the value of δ is restored to its initial value.

In yet another exemplary embodiment, if for a specified number of epochs the system error does not increase, then the location estimates of the unknown location nodes. having the N highest total errors, where N is a configurable number, are replaced with random locations. In yet another exemplary embodiment, the total error is computed as a weighted sum as given by $$E = w * \sum_{i}^{DKP} e_i + \sum_{j}^{DUP} e_j \quad (4)$$

instead of equation (3), where w is greater than 1, DKP is the total number of known location neighbor nodes and DUP is the total number of unknown location neighbor nodes.

GENERAL

Embodiments of the present disclosure may comprise systems having different architecture and methods having different information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

Some portions of the detailed description have been presented in terms of algorithms or processes which may take the form of a series of operations on data or signals stored in a computer memory. As a result, these operations take the form of manipulation or transformation of physical quantities. Such quantities may in some instances take the form of electrical or magnetic signals capable of being transformed, stored, retrieved, compared, combined or otherwise manipulated. It is to be understood that all such references to algorithms and processes also refer to the underlying physical quantities and their transformations and manipulations. Similarly, references herein to terms such as "computing," "processing," "determining," and similar terms refer to the actions of a computer or similar platform that transforms or otherwise manipulates data stored as physical quantities within the computer or platform.

Additional embodiments include a computer readable medium or media tangibly embodying program code for implementing one or more aspects of the present subject matter. As an example, embodiments can include media embodying program code executable by one or more processors of a computing system to cause the system to implement methods of estimating the physical location of one or more nodes in accordance with one or more aspects of the present subject matter as noted herein.

For instance, a processor in a computer system at the NOC such as processor 575 may access code that causes the NOC system to perform location estimates and output the resulting estimates to a display and/or store the resulting estimates in one or more computer-readable media.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like

We claim:

1. A method of estimating physical locations of one or more unknown-location nodes in a network comprising known-location nodes and unknown-location nodes, the method comprising:
    maintaining in a database known locations of the known-location nodes and estimates of locations of the unknown-location nodes;
    for each unknown-location node:
        receiving neighbor node distance estimates;
        choosing an initial location estimate;
        computing neighbor node distances between the initial location estimate and neighbor node locations of neighbor nodes;
        computing a total error from the received neighbor node distance estimates and the computed neighbor node distances;
        computing a stopping criterion;
        determining if the stopping criterion satisfies a stopping threshold;
        while the stopping criterion does not satisfy the stopping threshold:
            for each unknown-location node:
                choosing a subsequent location estimate that differs from a previous location estimate;
                computing updated neighbor node distances between the subsequent location estimate and neighbor node locations of neighbor nodes;
                computing an updated total error from the received neighbor node distance estimates and the computed neighbor node distances;
                determining if the stopping criterion satisfies a stopping threshold; and
            updating in the database the estimate of the locations of the unknown-location nodes if the stopping criterion satisfies the stopping threshold.

2. The method of claim 1 wherein choosing a subsequent location estimate that differs from a previous location estimate comprises determining the subsequent location estimate to be at a configurable distance in a configurable direction relative to the previous location estimate.

3. The method of claim 2 further comprising determining the configurable direction so as to minimize the maximum magnitude of tension between an unknown location node and the neighbor nodes.

4. The method of claim 1 wherein computing the stopping criterion comprises setting the stopping criterion to the total error.

5. The method of claim 1 wherein computing the stopping criterion comprises counting a number of epochs.

6. The method of claim 1 wherein choosing the initial location estimate comprises choosing the initial location estimate randomly.

7. The method of claim 1 wherein choosing the initial location estimate comprises:
    identifying two known-location neighbor nodes that have two shortest neighbor node distance estimates, and
    choosing the initial location based on the identified known-location neighbor nodes.

8. The method of claim 1 wherein choosing the initial location estimate comprises:
    identifying two unknown-location neighbor nodes that have the two shortest neighbor node distance estimates, and
    choosing the initial location based on the identified unknown-location neighbor nodes.

9. A system comprising:
    a non-transitory computer-readable medium; and
    one or more processors in communication with the non-transitory computer-readable medium, the one or more processors configured to:
        maintain in a database known locations of known-location nodes and estimates of locations of unknown-location nodes;
    for each unknown-location node:
        receive neighbor node distance estimates;
        choose an initial location estimate;
        compute neighbor node distances between the initial location estimate and neighbor node locations of neighbor nodes;
        compute a total error from the received neighbor node distance estimates and the computed neighbor node distances;
        compute a stopping criterion;
        determine if the stopping criterion satisfies a stopping threshold;
        while the stopping criterion does not satisfy the stopping threshold:
            for each unknown-location node:
                choose a subsequent location estimate that differs from a previous location estimate;
                compute updated neighbor node distances between the subsequent location estimate and neighbor node locations of neighbor nodes;
            compute an updated total error from the received neighbor node distance estimates and the computed neighbor node distances;
            determine if the stopping criterion satisfies a stopping threshold; and
        update in the database the estimate of the locations of the unknown-location nodes if the stopping criterion satisfies the stopping threshold.

10. The system of claim 9 wherein the one or more processors are further configured to choose a subsequent location estimate that differs from a previous location estimate by determining the subsequent location estimate to be at a configurable distance in a configurable direction relative to the previous location estimate.

11. The system of claim 10 wherein the one or more processors are further configured to determine the configurable direction so as to minimize the maximum magnitude of tension between an unknown location node and the neighbor nodes.

12. The system of claim 9 further comprising the database, the one or more processors in communication with the database.

13. The system of claim 9 wherein the one or more processors is configured to compute the stopping criterion by setting the stopping criterion to the total error.

14. The system of claim 9 wherein the one or more processors is configured to compute the stopping criterion by counting a number of epochs.

15. The system of claim 9 wherein the one or more processors is configured to choose the initial location estimate by choosing the initial location estimate randomly.

16. The system of claim 9 wherein the one or more processors is configured to choose the initial location estimate by:
- identifying two known-location neighbor nodes that have two shortest neighbor node distance estimates, and
- choosing the initial location based on the identified known-location neighbor nodes.

17. The system of claim 9 wherein the one or more processors is configured to choose the initial location estimate by:
- identifying two unknown-location neighbor nodes that have two shortest neighbor node distance estimates, and
- choosing the initial location based on the identified unknown-location neighbor nodes.

18. A non-transitory computer-readable medium comprising program code, the program code configured to cause a processor to execute a method, the program code comprising:
- program code for maintaining in a database known locations of known-location nodes and estimates of locations of unknown-location nodes;
- for each unknown-location node:
  - program code for receiving neighbor node distance estimates;
  - program code for choosing an initial location estimate;
  - program code for computing neighbor node distances between the initial location estimate and neighbor node locations of neighbor nodes;
  - program code for computing a total error from the received neighbor node distance estimates and the computed neighbor node distances;
  - program code for computing a stopping criterion;
  - program code for determining if the stopping criterion satisfies a stopping threshold;
  - while the stopping criterion does not satisfy the stopping threshold:
    - for each unknown-location node:
      - program code for choosing a subsequent location estimate that differs from a previous location estimate;
      - program code for computing updated neighbor node distances between the subsequent location estimate and neighbor node locations of neighbor nodes;
      - program code for computing an updated total error from the received neighbor node distance estimates and the computed neighbor node distances;
      - program code for determining if the stopping criterion satisfies a stopping threshold; and
  - program code for updating in the database the estimate of the locations of the unknown-location nodes if the stopping criterion satisfies the stopping threshold.

19. The non-transitory computer-readable medium of claim 18 wherein the program code for choosing a subsequent location estimate that differs from a previous location estimate comprises program code for determining the subsequent location estimate to be at a configurable distance in a configurable direction relative to the previous location estimate.

20. The non-transitory computer-readable medium of claim 19 further comprising program code for determining the configurable direction so as to minimize the maximum magnitude of tension between an unknown location node and the neighbor nodes.

21. The non-transitory computer-readable medium of claim 18 wherein the program code for computing the stopping criterion comprises program code for setting the stopping criterion to the total error.

22. The non-transitory computer-readable medium of claim 18 wherein the program code for computing the stopping criterion Comprises program code for counting a number of epochs.

23. The non-transitory computer-readable medium of claim 18 wherein the program code for choosing the initial location estimate comprises program code for choosing the initial location estimate randomly.

24. The non-transitory computer-readable medium of claim 18 wherein the program code for choosing the initial location estimate comprises:
- program code for identifying two known-location neighbor nodes that have two shortest neighbor node distance estimates, and
- program code for choosing the initial location based on the identified known-location neighbor nodes.

25. The non-transitory computer-readable medium of claim 18 wherein the program code for choosing the initial location estimate comprises:
- program code for identifying two unknown-location neighbor nodes that have two shortest neighbor node distance estimates, and
- program code for choosing the initial location based on the identified unknown-location neighbor nodes.

* * * * *